US009696128B2

(12) United States Patent
Ott

(10) Patent No.: US 9,696,128 B2
(45) Date of Patent: Jul. 4, 2017

(54) MEASURING ACCESSORY FOR TOOLS

(71) Applicant: Kurt Ott, Schwenksville, PA (US)

(72) Inventor: Kurt Ott, Schwenksville, PA (US)

( * ) Notice: Subject to any disclaimer, the term of this patent is extended or adjusted under 35 U.S.C. 154(b) by 231 days.

(21) Appl. No.: 14/530,093

(22) Filed: Oct. 31, 2014

(65) Prior Publication Data
US 2015/0121712 A1    May 7, 2015

Related U.S. Application Data

(60) Provisional application No. 61/898,913, filed on Nov. 1, 2013.

(51) Int. Cl.
*G01B 3/04* (2006.01)

(52) U.S. Cl.
CPC ........................ *G01B 3/04* (2013.01)

(58) Field of Classification Search
CPC .. G01B 3/00; G01B 3/02; B27B 17/02; B27B 17/00
USPC ................... 33/464, 465, 630, 499
See application file for complete search history.

(56) References Cited

U.S. PATENT DOCUMENTS

| | | | | |
|---|---|---|---|---|
| 946,414 A * | 1/1910 | Wikander | ............... | B26B 29/04 30/233 |
| 3,196,548 A * | 7/1965 | Moore | ................. | G01B 3/08 248/206.5 |
| 4,203,227 A * | 5/1980 | Giroux | ................. | E04F 21/04 33/458 |
| 4,233,739 A * | 11/1980 | Hinrichs | ............. | B27B 17/0025 30/383 |
| 4,275,504 A * | 6/1981 | Chontos | ............. | B27B 17/0025 30/383 |
| 4,299,034 A * | 11/1981 | DeBetta | ............. | B27B 17/0025 33/630 |
| 4,377,910 A * | 3/1983 | Landry, Jr. | .......... | B27B 17/0025 30/383 |
| 4,561,186 A * | 12/1985 | Keefe | ................. | B27B 17/0025 30/383 |
| 5,265,342 A * | 11/1993 | Lang, Jr. | ................. | E04F 21/18 30/290 |
| 5,901,457 A * | 5/1999 | Harding | ................... | G01B 3/02 30/383 |

(Continued)

OTHER PUBLICATIONS

"The Woodcutters Helper, Firewood Measuring Attachments for your chainsaw," 2010, retrieved online on Sep. 1, 2016 <<from http://www.chainsawaccessories.biz, 11 pages.

*Primary Examiner* — Yaritza Guadalupe-McCall
(74) *Attorney, Agent, or Firm* — Saul Ewing LLP

(57) ABSTRACT

A fixed-length measurement accessory includes a rigid body fixed to a base supporting a magnet for magnetically coupling the accessory to a host tool. An opposite end of the rigid body provides a visual marker for alignment with an end of a workpiece. A variable-length accessory includes telescoping rigid bodies joined by a coupler. One end of one rigid body is joined to a base supporting a magnet for magnetically coupling the accessory to the host tool. The coupler houses a friction member creating light friction resisting adjustment of a combined length of the rigid bodies. An opposite end of the other rigid body provides a visual marker for alignment with an end of the workpiece. Markings are provided on at least one of the rigid bodies for indicating a combined length of the rigid bodies at multiple relative positions.

25 Claims, 6 Drawing Sheets

(56) References Cited

U.S. PATENT DOCUMENTS

| | | | | |
|---|---|---|---|---|
| 6,295,738 B1* | 10/2001 | Risch | ............. | B23Q 17/24 |
| | | | | 33/263 |
| 6,467,174 B1* | 10/2002 | Kotori | ............. | B26B 29/06 |
| | | | | 30/293 |
| 6,629,370 B1* | 10/2003 | Sposato | ............. | B26B 29/06 |
| | | | | 30/29 |
| 7,178,246 B2* | 2/2007 | McCallum | ............. | B26B 5/005 |
| | | | | 30/293 |
| 7,818,888 B2* | 10/2010 | Bahler | ............. | B25H 7/00 |
| | | | | 33/32.2 |
| 7,861,416 B1* | 1/2011 | Clark | ............. | B27B 17/0025 |
| | | | | 30/371 |
| 7,886,447 B2* | 2/2011 | Cruz | ............. | B26B 29/06 |
| | | | | 33/32.2 |
| 8,756,820 B2* | 6/2014 | Bartolini | ............. | A41H 1/04 |
| | | | | 33/8 |
| 2009/0165315 A1* | 7/2009 | Rabin | ............. | A47G 1/205 |
| | | | | 33/485 |

* cited by examiner

MEASURING ACCESSORY FOR TOOLS

CROSS-REFERENCE TO RELATED APPLICATIONS

The present application claims the benefit of priority, under 35 U.S.C. 119(e), of U.S. Provisional Patent Application No. 61/898,913, filed Nov. 1, 2013, the entire disclosure of which is hereby incorporated herein by reference.

FIELD OF THE INVENTION

The present invention relates generally to accessories for manually-operated and/or power tools, such as gasoline- and electric-powered tools, including chainsaws.

BACKGROUND

The present invention can be adapted for use with a variety of tools, including cutting tools such as motorized chainsaws. Generally, chain saws include a motor for powering the chain saw, a guide bar and a saw chain circulating about the guide bar. Chain saws are exemplary of certain power tools that are intended to make cuts or otherwise operate on a work-piece at a specific location on the work-piece, e.g., to cut pieces of a desired length.

SUMMARY

The present invention provides a measurement accessory for use in conjunction with a host tool to provide for measurement of work pieces. The measurement accessory is configured to be readily mountable to and dismountable from the host tool, preferably without the use of hand tools. Preferably, the measurement accessory is readily mountable/dismountable via magnetic coupling with host tool.

In accordance with one aspect of the present invention, a fixed-length measuring tool accessory is provided. In one such embodiment, the fixed-length measuring tool accessory comprises: a rigid body extending longitudinally between first and second ends; a base fixed to the first end of the rigid body, the base having a tool-mounting section and a body-mounting sections, the tool-mounting section defining a socket, the first end of the rigid body being fixed to the body-mounting section; a magnet fixedly mounted within the socket; and a cap, the cap having a longitudinally-extending fitting fixed to the second end of the rigid body, and a surface extending transversely to a direction of elongation of the fitting, the surface having an area that is substantially greater than a cross-sectional area of the second end of the rigid body.

In accordance with one aspect of the present invention, a variable-length measuring tool accessory is provided. In one such embodiment, the variable-length measuring tool comprises: a first rigid body extending longitudinally between first and second ends; a base fixed to the first end of the rigid body, the base having a tool-mounting section and a body-mounting sections, the tool-mounting section defining a socket, the first end of the rigid body being fixed to the body-mounting section; a magnet fixedly mounted within the socket; a second rigid body extending longitudinally between respective first and second ends; and a coupler joined to one of the first and second rigid bodies, the coupler comprising a friction member dimensioned for receipt of an other of the first and second rigid bodies in a friction fit, the coupler mating the first and second rigid bodies in a telescoping relationship.

BRIEF DESCRIPTION OF THE FIGURES

An understanding of the following description will be facilitated by reference to the attached drawings, in which.

DETAILED DESCRIPTION

The present invention provides measurement accessories mountable to a host tool, such as a power tool. The measurement accessory may be used as a measurement guide for measuring a work piece, for example to place cuts, etc. relative to a work piece. For example, the measurement accessory may be used as a guide for using a chainsaw to cut lengths of logs suitable for splitting into firewood (e.g., 16 inch lengths) or for transportation/storage purposes, etc.

FIGS. 1-5 show an embodiment of an exemplary fixed-length measurement accessory 100. This embodiment of the accessory 100 is adapted to be magnetically secured to the host tool. More specifically, the accessory includes a unitary, rigid, fixed-length elongated body 110, which may for example may be a thin-walled aluminum, plastic, carbon fiber or fiberglass tube. The tube may be of any desired length, but corresponds to the length of the work piece that is intended to be measured. For example, a 16 inch long body may be desirable for configuring the accessory for marking cuts to provide (approximately) 16 inch long logs/work pieces. In instances where the mounting point is spaced from the cutting blade, etc., the length of the tube may be adjusted in correspondence to such spacing to facilitate accurate length indications.

Figure 1:
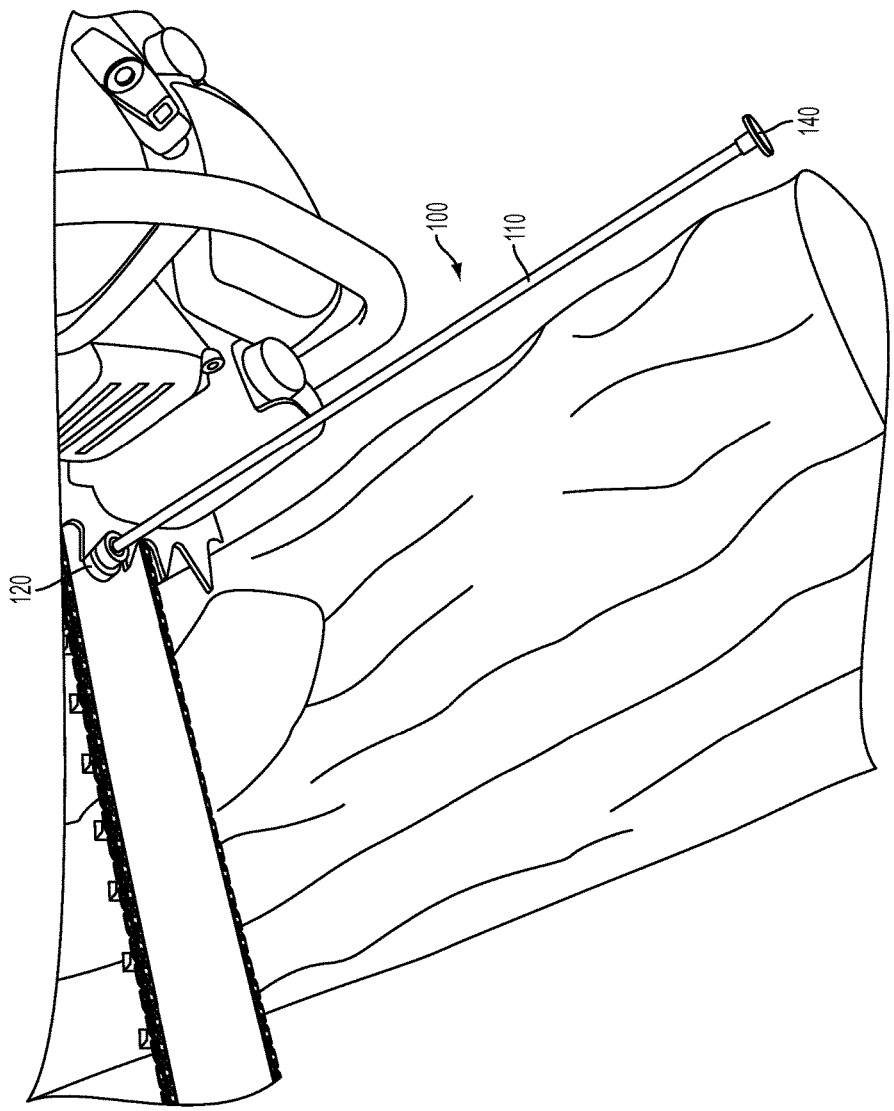
FIG. 1 is a perspective view of an exemplary fixed-length measuring tool accessory in accordance with an exemplary embodiment of the present invention, shown attached to an exemplary chainsaw.
Figure 2:
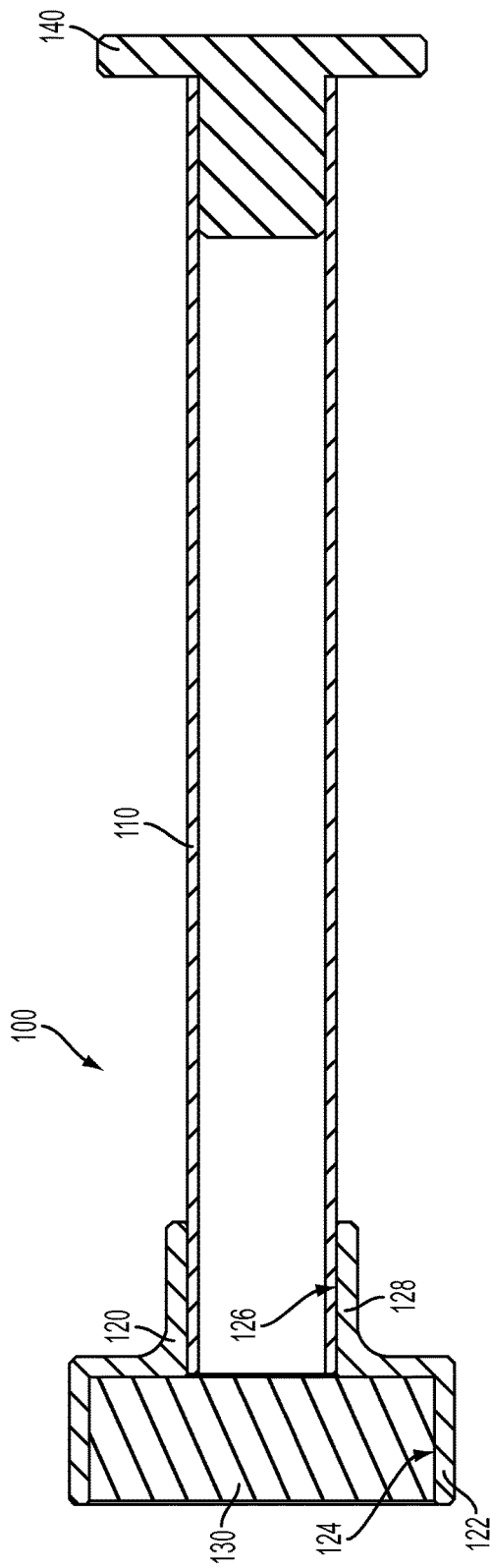
FIG. 2 is a cross-sectional view of the measuring tool accessory of FIG. 1.
Figure 5:
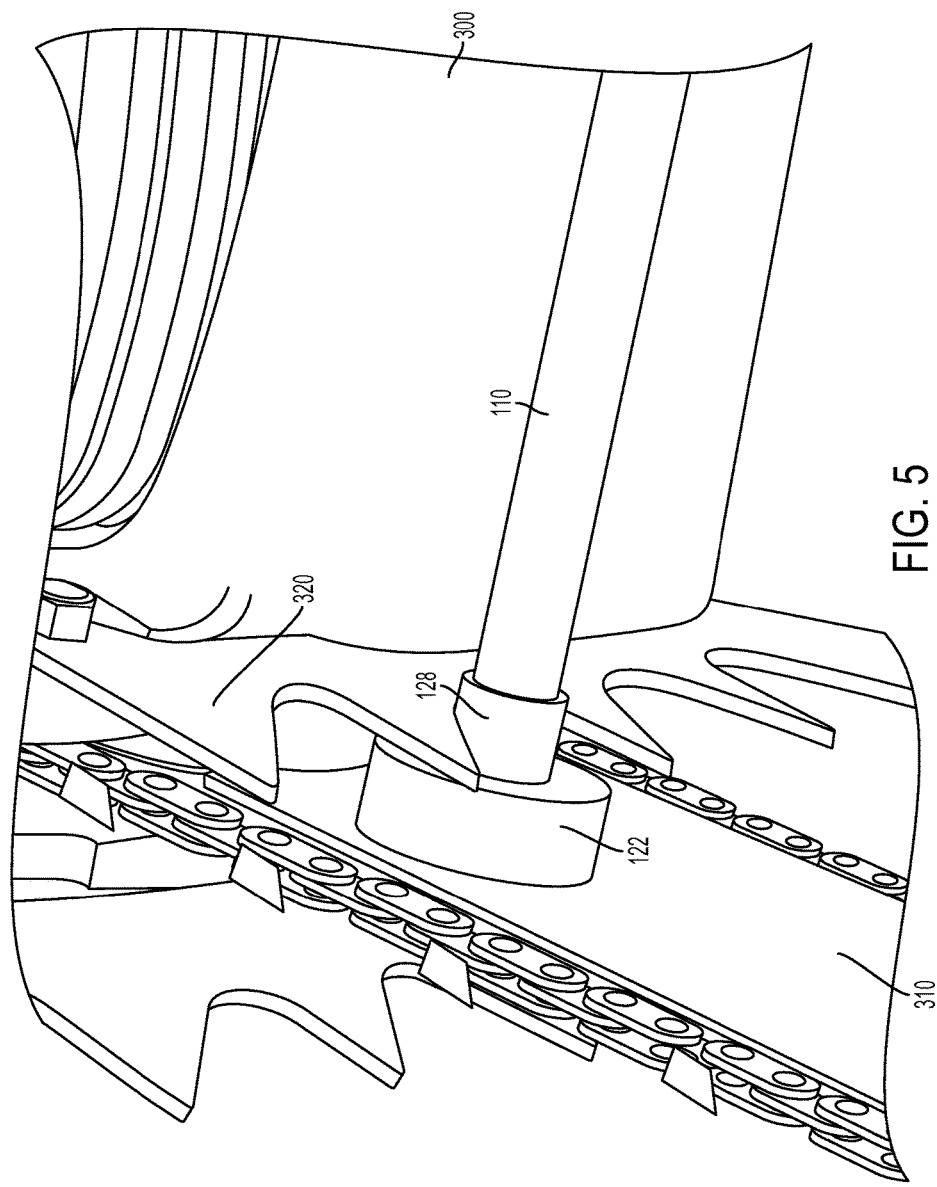
FIG. 5 is an enlarged perspective view of the measuring tool accessory and exemplary host tool of FIG. 1.

The measurement accessory 100 further includes a base 120. The base 120 has a tool-mounting section 122 and a body-mounting section 128. The tool mounting section 122 supports a magnet for mounting the accessory to the host tool. In one embodiment, the tool-mounting section defines a first socket 124 for receiving a magnet 130, such as a 0.375" thick×0.75" diameter neodymium magnet, and the body-mounting section defines a second socket 126 for receiving an end of the elongated body 110, as shown in FIG. 2. In one embodiment, the tool-mounting section 122 and the body-mounting section 128, have different external dimensions, the tool-mounting section having a larger cross-sectional area than the body-mounting section. In one exemplary embodiment, the tool-mounting section has a height (as measured in the direction of elongation of the elongated body 110) that is sufficiently small to fit between a chainsaw guide bar 310 and bucking spike plate 320, as best shown in FIGS. 1 and 5. By way of example, a height of less than 0.5 inches has been found suitable for use with various chainsaws. Further, in such an embodiment the body-mounting section 128 has an external dimension smaller than an external dimension of the tool-mounting section 122, and the external dimension of the body-mounting section 128 is sufficiently small to permit receipt between adjacent teeth of a bucking plate 320 of a chainsaw 300. By way of example, an external diameter of less than 0.625 inches has been found suitable for use with various chainsaws.

Figure 3:
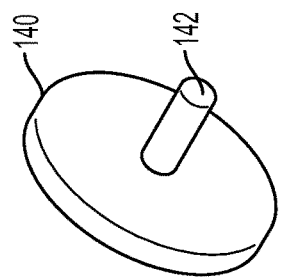
FIG. 3 is a perspective view of an exemplary cap for use as a marker at a distal end of a measuring tool accessory.
Figure 4:
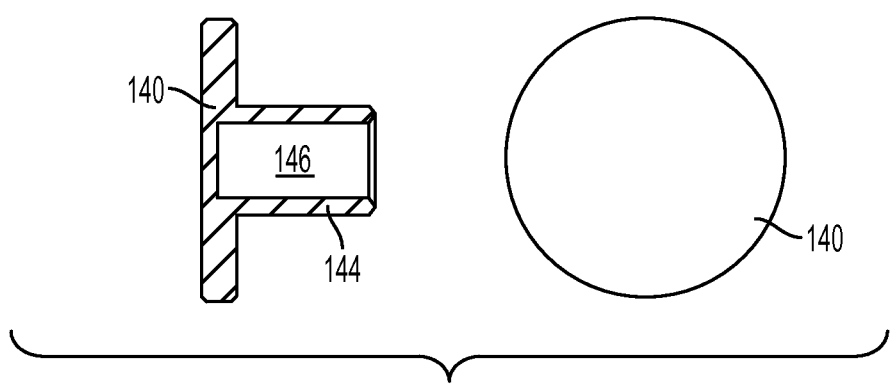
FIG. 4 is a cross-sectional view of an alternative embodiment of a cap for use as a marker at a distal end of a measuring tool accessory.

Optionally, a cap 140 may be secured to an opposite end of the elongated body 110 by any suitable means. The cap has a cross-sectional area greater than a cross-sectional area of the elongated body, and acts as a visual marker during use of the measurement accessory. FIG. 3 shows an exemplary embodiment of a cap 140 that has a narrow pin dimensioned for receipt in a hollow distal end of the elongated body 110. FIG. 4 shows an alternative embodiment of a cap 140 having a stem defining a socket 146 dimensioned for receiving the distal end of the elongated body 110.

Optionally, the cap 140 may include one or more LEDs, or alternative light sources, so that the cap may be more effectively used as a visible marker in low ambient lighting conditions.

In use, the measurement accessory 100 may be magnetically coupled to, and thus mounted to, a metallic portion of a host tool, e.g., on a chainsaw guide bar 310 behind the bucking spikes 320, e.g., in the valley of the bucking spike teeth furthest away from the cutting chain behind the bucking spikes plate that is mounted to the chainsaw motor housing, as shown in FIG. 5. Placing the magnetic base 120 on the chainsaw guide bar, and behind the bucking spikes plate, preferably in the valley between adjacent teeth of the bucking plate and toward the center of the height of the guide bar, allows for the user to lightly bump the cap 140 against the wood to be cut/work piece, and the measurement accessory 100 will be magnetically drawn back to its correct position and once again remain perpendicular to the length of the chainsaw guide bar. Once the measurement accessory 100 is placed correctly on the chainsaw guide bar 310, the measurement accessory 100 can be used to quickly, accurately and successively cut firewood/wood to a desired length, e.g., by visually aligning the end of the tube/cap 40 with an end of the work piece before making a next cut, as best shown in FIG. 1.

This measurement accessory 100 will also help the user achieve to a more "square" 90-degree/right angle cut in a work piece by acting as a visual indicator that helps the user to keep the accessory 100 aligned with, e.g. generally parallel to, the log/wood/work piece to be cut. Placing the accessory 100 on either the right- or left-side face of the guide bar automatically places the accessory perpendicular to the guide bar, thereby creating an easy-to-see right angle with the tool protruding from the guide bar's surface.

By aligning the end cap 140 of the accessory 100 with a cut log or piece of wood, the user can move along a log and make repeated, hands-free measurement of the work piece and cut corresponding lengths in consistent repeated fashion. The accessory 100 facilitates a series of cuts to proceed to the left, or to the right, of the tool by mounting the accessory 100 to the right or left of the host tool, respectively.

Figure 6:
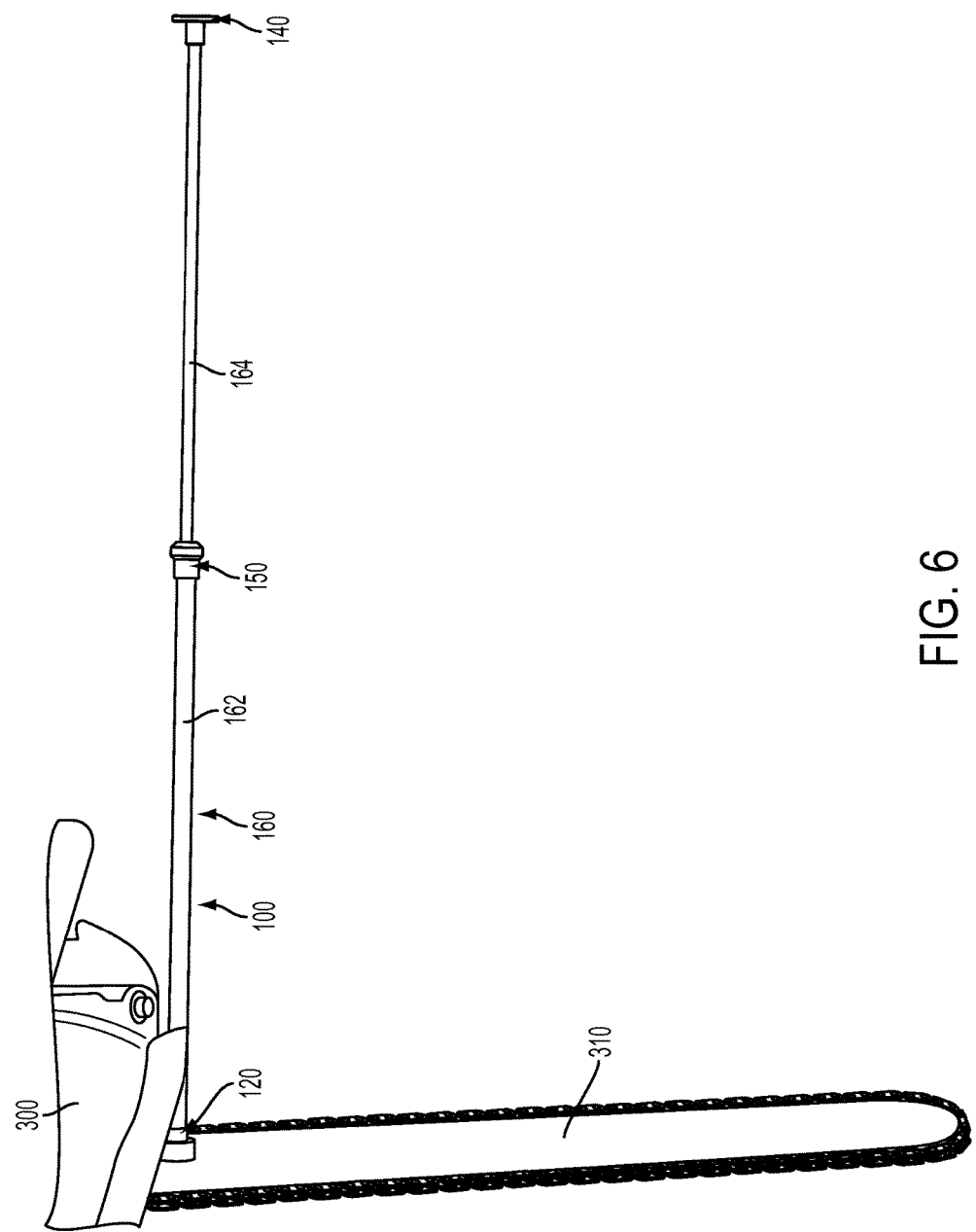
FIG. 6 is a top view of an exemplary adjustable-length measuring tool accessory in accordance with an exemplary embodiment of the present invention shown attached to an exemplary chainsaw.
Figure 7:
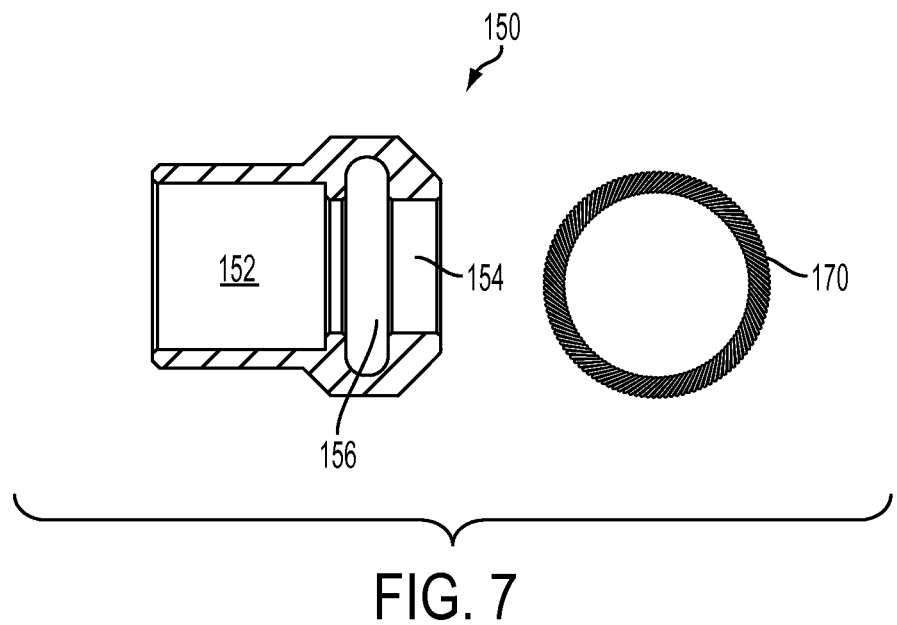
FIG. 7 is a cross-sectional view of a coupler of the adjustable-length measuring tool of FIG. 6.

FIGS. 6-7 show an alternative embodiment of an exemplary measurement accessory 100. Unlike the fixed-length measurement accessory described above in relation to FIGS. 1-5, the embodiment shown in FIGS. 6-7 is a variable-length accessory 100 that includes a multi-piece rigid telescoping body 160 that includes at least two nested and telescoping bodies, such as tubes 162, 164. The fixed tube 162 is joined at one end to a base 120 that may be the same or substantially similar to the base 120 described above and shown in FIG. 2, although it will be appreciated that a larger and/or stronger magnet/base may be employed to support the weight of the larger/longer body/tubes. A neodymium magnet measuring 0.375" thick and 1.0" in diameter has been found suitable for this purpose.

In the exemplary embodiment, the fixed tube 162 has a relatively large inner diameter, and the sliding tube 164 has a relatively smaller outer diameter, as shown in FIG. 6. A cap 140 may be mounted on the distal end of the sliding tube 134, to serve as a visual marker as described above.

The sliding tube 164 may be provided with markings, e.g. by printing, scoring, etching, etc. to provide a scale, e.g., in inches, centimeters, etc. that indicates the combined length of the nested tubes at various relative positions, e.g., between 13 and 26 inches in length.

The tubes 162 and 164 are joined by a coupler 150 that allows the tubes to translate relative to one another in telescoping fashion, but also tends to keep the sliding tube 164 in a constant position relative to the fixed tube 162 by friction. An exemplary coupler 150 is shown in FIG. 7. As shown in FIG. 7, the exemplary coupler 150 has a first section 152 dimensioned to receive and retain the fixed tube 162 in a friction/interference fit, such that the coupler 150 generally stays fixed positioned on the end of the fixed tube 162. Further, the coupler 150 has a port 154 dimensioned to admit passage of the sliding tube 164 with a close fit. Further still, the coupler 150 defines a bay for supporting a friction member that is positioned to engage with light friction an outer surface of the sliding tube 164. The friction member and tube are coordinated so that the light friction provided allows for easy manual adjustment of the nested tubes to provide a desired body length, but resists incidental and unintended movement of the relative positions of the tubes, so that the telescoping body tends to maintain its length until deliberately adjusted by a user. In this exemplary embodiment, the friction member is a coil spring 170 housed within a bay that is a raceway 156 encircling the coupler and the sliding tube 134, but it will be appreciated that any suitable friction arrangement may be provided. Alternatively, a screw-type or other latching mechanism may be employed to secure the shafts in desired relative positions.

Accordingly, the variable length measurement accessory has a telescoping shaft that can be pulled out or pushed into the inside diameter of the larger diameter mating tube connected the magnetic base. The user pulls out or pushes in the sliding tube to the desired length marked on the tube in a scale format with lines and numbers denoting the length of wood to be cut in inches and or centimeter increments. By aligning the scale lines and desired number length to the front nose edge of the coupler 150, the sliding tube can be accurately positioned to provide the desired length of the accessory. The friction spring 170 creates enough resistance on the tube surfaces to securely hold the sliding tube in place, and also to allow the user to quickly and easily change the length of wood to be cut by pushing or pulling the sliding tube to the desired length without use of any other tools.

Figure 8:
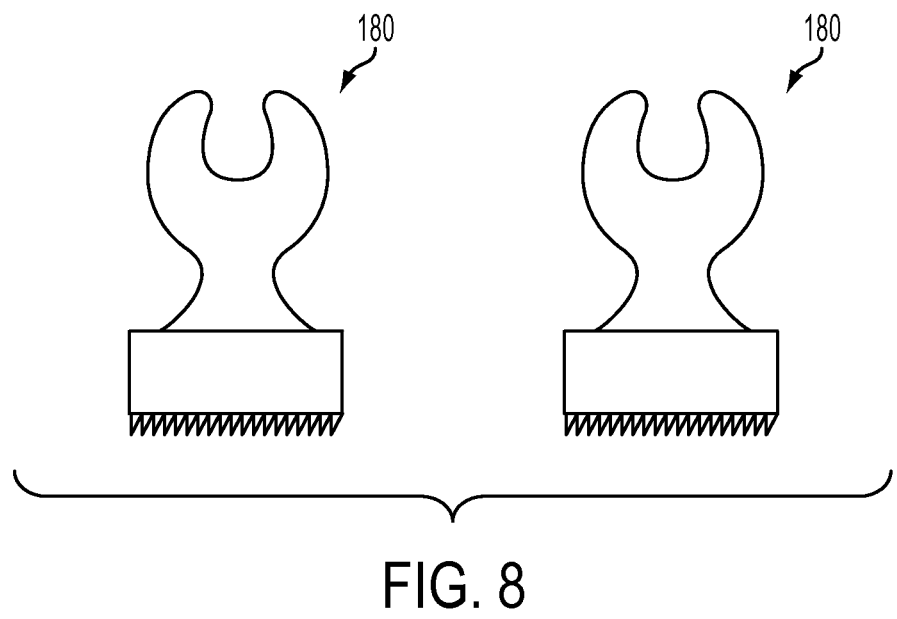
FIG. 8 is a side view of exemplary mounting clips for mounting a measuring tool accessory to a host tool.

Also provided are mounting clips 180, as shown in FIG. 8. These clips may be provided as adhesive-backed aftermarket accessories securable to the host power tool. The clips include opposed arms 182 configured and positioned to be resiliently displaced by a body 110/160 of a measurement accessory 100 passing therebetween, and then to resile to retain and support the accessory, in a snap-fit engagement. Accordingly, after the user is finished using the measurement accessory 100, it can be placed in mounting clips 180 mounted with adhesive or other fastener to the host tool's chain bar scabbard/cover. Thus, the accessory 100 can be conveniently carried with the host tool.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A fixed-length measuring tool accessory comprising:
a rigid body extending longitudinally between first and second ends;
a base fixed to the first end of the rigid body, the base having a tool-mounting section and a body-mounting section, the tool-mounting section defining a socket and having a height that is less than a distance between a guide bar and a bucking spike plate of a chainsaw, the first end of the rigid body being fixed to the body-mounting section, the body-mounting section having a diameter that is less than a distance between adjacent teeth of the bucking spike plate of the chainsaw;
a magnet fixedly mounted within the socket; and
a cap, the cap having a longitudinally-extending fitting fixed to the second end of the rigid body, and a transverse surface extending transversely to a direction of elongation of the fitting, the transverse surface having an area that is substantially greater than a cross-sectional area of the second end of the rigid body, said transverse surface comprising human-readable indicia provided on the surface and indicating a length of the measuring tool accessory.

2. The fixed-length measuring tool accessory of claim 1, wherein the tool-mounting section of the base has a cross-sectional area greater than a respective cross-sectional area of the body-mounting section of the base.

3. The fixed-length measuring tool accessory of claim 1, wherein the tool-mounting section defines a respective socket having a transverse dimension greater than 0.5 inches, and wherein the body-mounting section has a transverse dimension less than 0.5 inches.

4. The fixed-length measuring tool accessory of claim 1, wherein the tool-mounting section has a height, as measured in a direction of elongation of the elongated body, less than 0.5 inches.

5. The fixed-length measuring tool accessory of claim 1, wherein and body-mounting section has an external transverse dimension of less than 0.625 inches.

6. The fixed-length measuring tool accessory of claim 1, wherein the rigid body comprises a socket dimensioned for receiving the second end of the rigid body.

7. A fixed-length measuring tool accessory comprising:
a rigid body extending longitudinally between first and second ends;
a base fixed to the first end of the rigid body, the base having a tool-mounting section and a body-mounting section, the tool-mounting section defining a socket, the first end of the rigid body being fixed to the body-mounting section;
a magnet fixedly mounted within the socket; and
a cap, the cap having a longitudinally-extending fitting fixed to the second end of the rigid body, and a surface extending transversely to a direction of elongation of the fitting, the surface having an area that is substantially greater than a cross-sectional area of the second end of the rigid body, said cap further comprising a light source.

8. A fixed-length measuring tool accessory comprising:
a rigid body extending longitudinally between first and second ends;
a base fixed to the first end of the rigid body, the base having a tool-mounting section and a body-mounting section, the tool-mounting section defining a socket, the first end of the rigid body being fixed to the body-mounting section;
a magnet fixedly mounted within the socket; and
a cap, the cap having a longitudinally-extending fitting fixed to the second end of the rigid body, and a surface extending transversely to a direction of elongation of the fitting, the surface having an area that is substantially greater than a cross-sectional area of the second end of the rigid body;
wherein the rigid body has a hollow portion at its second end, and wherein the fitting of the cap comprises a pin dimensioned for receipt in the hollow portion of the rigid body.

9. A measuring tool accessory comprising: a rigid body extending longitudinally between first and second ends, said rigid body comprising human-readable indicia in the nature of markings indicating a length of the accessory; a base fixed to the first end of the rigid body, the base defining a socket, said base having a height that is less than 0.5 inches, to fit between a guide bar and a bucking spike plate of a chainsaw; and a magnet fixedly mounted within the socket.

10. The measuring tool accessory of claim 9, further comprising:
a cap fixed to the second end of the rigid body.

11. The measuring tool accessory of claim 10, wherein the cap comprises an axially-extending fitting for mounting to the rigid body, and a surface extending transversely to the axis of the fitting.

12. The measuring tool accessory for claim 11, wherein the human-readable indicia is provided as printing, scoring or etching.

13. A variable-length measuring tool accessory comprising:
a first rigid body extending longitudinally between first and second ends;
a base fixed to the first end of the rigid body, the base having a tool-mounting section and a body-mounting sections, the tool-mounting section defining a socket, the first end of the rigid body being fixed to the body-mounting section;
a magnet fixedly mounted within the socket;
a second rigid body extending longitudinally between respective first and second ends; and
a coupler joined to one of the first and second rigid bodies, the coupler comprising a friction member dimensioned for receipt of an other of the first and second rigid bodies in a friction fit, the coupler mating the first and second rigid bodies in a telescoping relationship.

14. The variable-length measuring tool accessory of claim 13, further comprising:
a cap fixed to the second end of the second rigid body.

15. The variable-length measuring tool accessory of claim 14, wherein the cap comprises an axially-extending fitting for mounting to the rigid body, and a surface extending transversely to the axis of the fitting.

16. The variable-length measuring tool accessory of claim 15, wherein the coupler defines an internal annular raceway for housing the friction member, wherein the friction member comprises a coil spring, and wherein the raceway and coil spring are dimensioned to receive an outer dimension of the second rigid body in a friction fit.

17. The variable-length measuring tool accessory of claim 13, wherein the tool-mounting section of the base has a cross-sectional area greater than a respective cross-sectional area of the body-mounting section of the base.

18. The variable-length measuring tool accessory of claim 13, wherein the tool-mounting section defines a respective socket having a transverse dimension greater than 0.5 inches, and wherein the body-mounting section has a transverse dimension less than 0.5 inches.

19. The variable-length measuring tool accessory of claim 13, wherein the tool-mounting section has a height, as measured in a direction of elongation of the elongated body, less than 0.5 inches.

20. The variable-length measuring tool accessory of claim 13, wherein and body-mounting section has an external transverse dimension of less than 0.625 inches.

21. The variable-length measuring tool accessory of claim 13, wherein the cap comprises a light source.

22. The variable-length measuring tool accessory of claim 13, wherein the rigid body has a hollow portion at its second end, and wherein the fitting of the cap comprises a pin dimensioned for receipt in the hollow portion of the rigid body.

23. The variable-Length measuring tool accessory of claim 13, wherein the rigid body the fitting of the cap comprises a socket dimensioned for receiving the second end of the rigid body.

24. The variable-length measuring tool accessory of claim 13, wherein at least one of the rigid bodies is provided with markings for indicating a combined length of the rigid bodies at multiple relative positions.

25. The variable length measuring tool accessory of claim 13, wherein said coupler is a screw-type latching mechanism.

* * * * *